(12) United States Patent
Mettler et al.

(10) Patent No.: US 6,567,583 B2
(45) Date of Patent: *May 20, 2003

(54) MODE CONVERTER AND METHOD

(75) Inventors: Stephen C. Mettler, Atlanta; Willard C. White, III, Suwanee, both of GA (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 220 days.

(21) Appl. No.: 09/280,457

(22) Filed: Mar. 30, 1999

(65) Prior Publication Data

US 2002/0085805 A1 Jul. 4, 2002

(51) Int. Cl.[7] .................................. G02B 6/26
(52) U.S. Cl. .......................... 385/28; 385/35
(58) Field of Search ................ 385/28, 29, 35

(56) References Cited

U.S. PATENT DOCUMENTS 5,077,815 A * 12/1991 Yoshizawa et al. ........... 385/28
5,080,461 A    1/1992 Pimpinella ................... 385/65
5,123,073 A    6/1992 Pimpinella ................... 385/59
5,257,332 A * 10/1993 Pimpinella ................... 385/59

FOREIGN PATENT DOCUMENTS

| EP | 0 226 881 A2 | 7/1987 |
| EP | 0 361 498 A2 | 4/1990 |
| EP | 0 367 073 A2 | 5/1990 |
| EP | 0 473 339 A1 | 3/1992 |

OTHER PUBLICATIONS

Yasushi—Patent Abstracts—Optical Fiber Coupler –Publication No. 61182008, date: Aug. 14, 1986.

* cited by examiner

Primary Examiner—Cassandra Spyrou
Assistant Examiner—Alessandro V. Amari
(74) Attorney, Agent, or Firm—Thomas, Kayden, Horstemeyer & Risley, LLP

(57) ABSTRACT

Disclosed is a system and method for converting modes in an optical network. Briefly described, the system comprises an optical pathway extending from an exit face of a single-mode waveguide to an entrance face of a multimode waveguide. A first ball lens and second ball lens are located in the optical pathway, with an optical link gap located the first and second ball lenses.

12 Claims, 5 Drawing Sheets

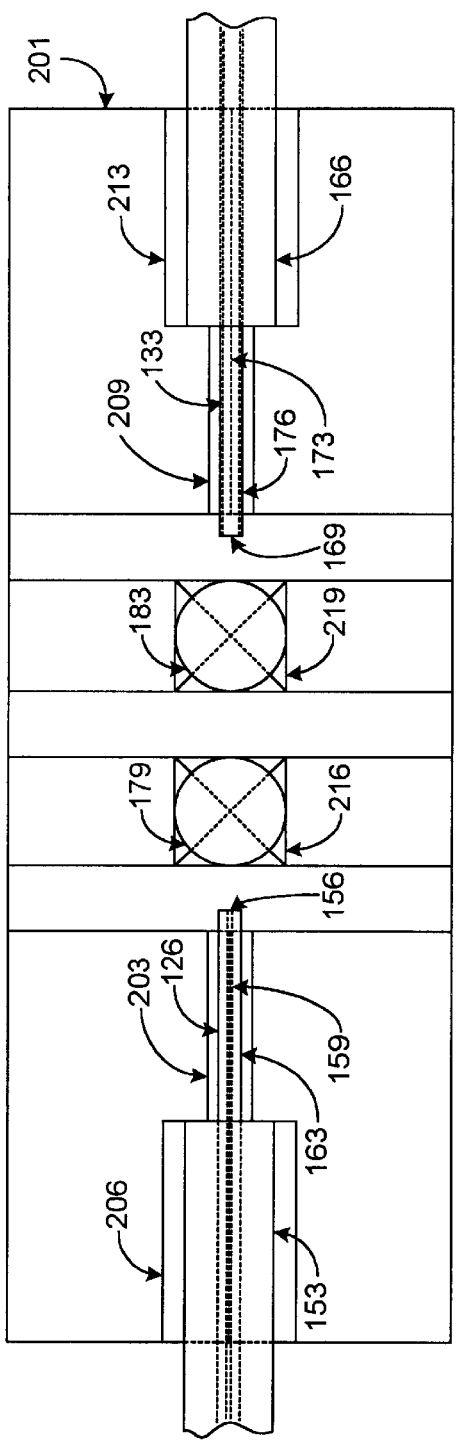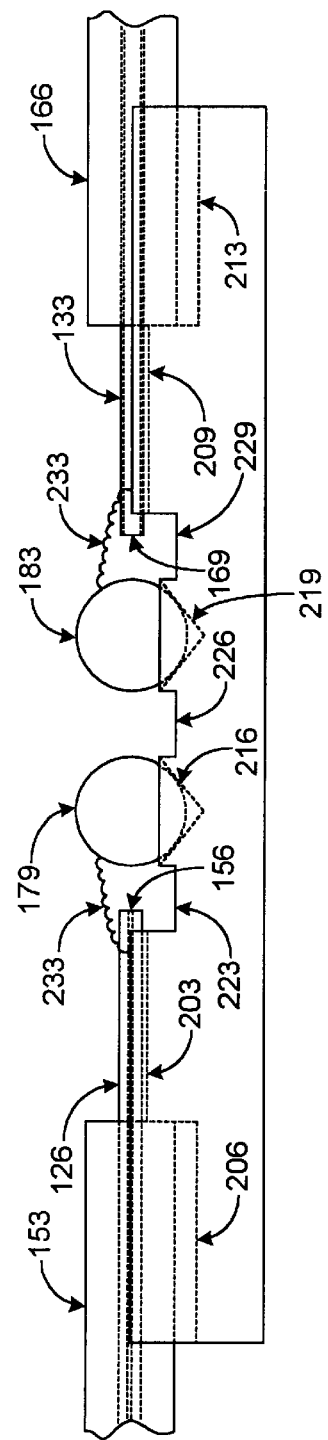
Fig. 3A
Fig. 3B

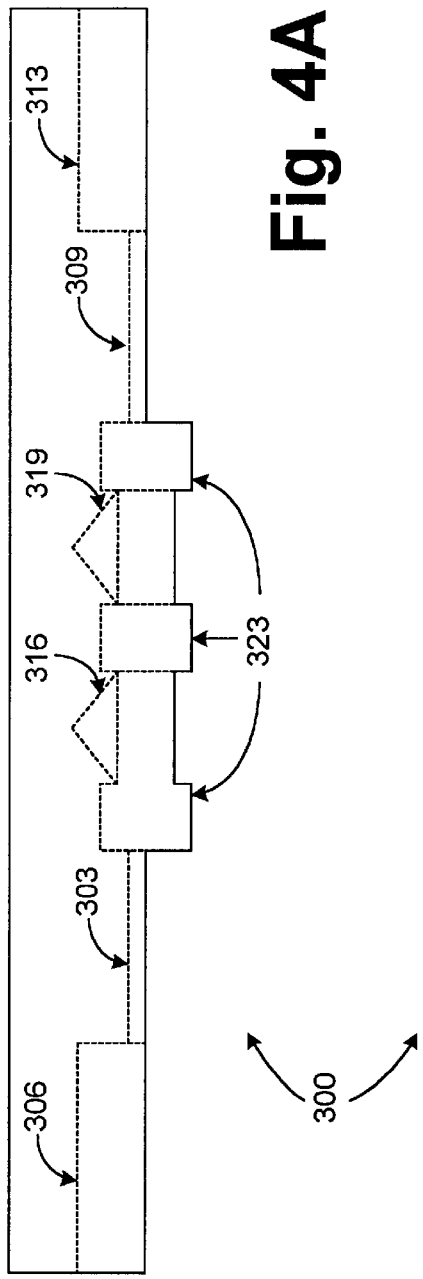
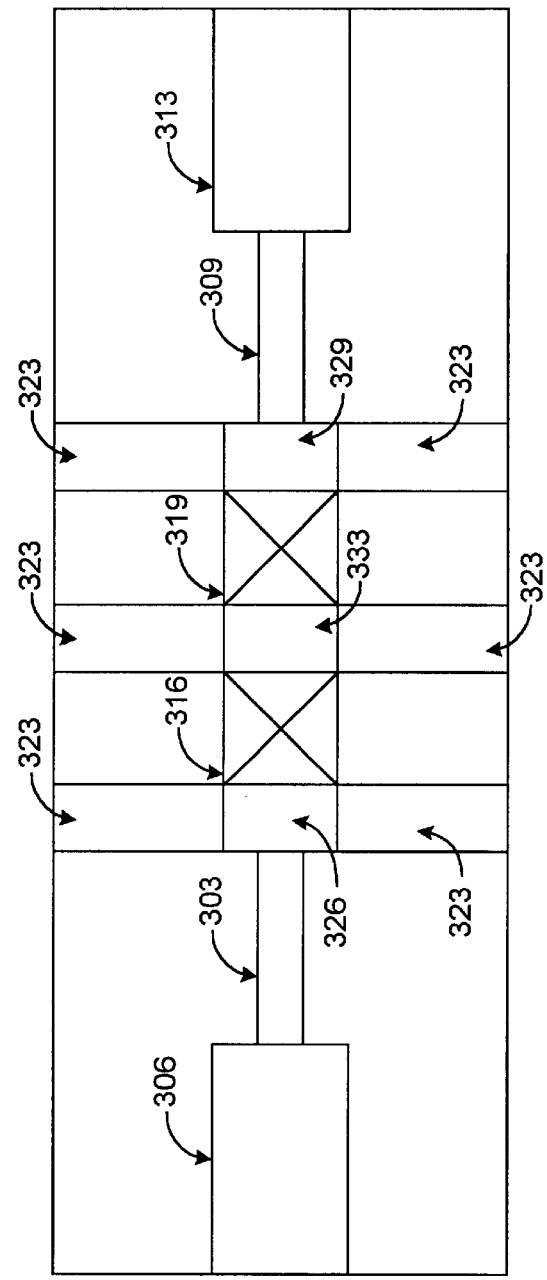

MODE CONVERTER AND METHOD

TECHNICAL FIELD

The present invention is generally related to optical networks and, more particularly, to a system and method for mode conversion in an optical network.

BACKGROUND OF THE INVENTION

Optical networks which are used for data communications and other like applications provide distinct advantages over their predecessor electrical network technologies. Chief among these advantages is a much higher rate of speed than that of electrical counterpart networks. Because of this advantage and others, such as bandwidth, optical networks are more and more being installed for local area networking applications (LANs) in office buildings, homes, and other locations as well as wide area networking applications.

With regard to the local area networking applications, often times the optical fibers employed in such environments are multimode optical fibers through which data is transmitted that originates from light emitting diodes (LEDs). While such networks provide a much faster rate of data communication than do electrical network counterparts, they are generally limited in data rate due to the data rate limitations characteristic of light emitting diodes.

In contrast, lasers have much higher data rates than light emitting diodes and have been proposed as replacements for light emitting diodes in existing optical local area networks, etc. However, the use of lasers with existing multimode optical fiber networks is problematic. Specifically, when transmitting through multimode optical fibers, lasers do not to excite all of the modes in a multimode optical fiber. This is unacceptable when, for example, passive star couplers or like devices are used for branching or distribution in the multimode optical networks. Upon encountering a star coupler, the laser radiation is often distributed among the various branches of the star coupler unevenly, which may result in the loss of signal in certain branches. In particular, this is true when the optical fiber is a graded index multimode fiber as the single-mode radiation tends to stay in the same relative modes within the multimode optical fiber.

SUMMARY OF THE INVENTION

The present invention provides a system and method for converting modes in an optical network. Briefly described, in architecture, the system comprises an optical pathway extending from an exit face of a single-mode waveguide to an entrance face of a multimode waveguide. A first ball lens and second ball lens are located in the optical pathway, with an optical link gap located between the first and second ball lenses.

The present invention can also be viewed as providing a method for converting modes in an optical network. In this regard, the method can be broadly summarized by the following steps: transmitting a laser beam along an optical pathway extending from an exit face of a single-mode waveguide to an entrance face of a multimode waveguide, and manipulating the laser beam using a first ball lens and second ball lens located in the optical pathway having an optical link gap therebetween to excite multiple modes in the multimode waveguide.

The present invention includes a significant advantage in that high speed lasers may be employed with existing multimode optical networks to increase the operating speeds of such systems. A further advantage of the present invention is that the mode converter embodiment may be constructed using an existing manufacturing platform. Other advantages of the various embodiments of the present invention is that it is simple in design, user friendly, robust, reliable, and efficient in operation, and easily implemented for mass commercial production.

Other features and advantages of the present invention will become apparent to one with skill in the art upon examination of the following drawings and detailed description. It is intended that all such additional features and advantages be included herein as being within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 3A is a top view of a substrate assembly of the mode converter of FIG. 2;

FIG. 3B is a side view of the substrate assembly of the mode converter of FIG. 2;

FIG. 4A is side view of a cover that is mated with the substrate assembly of the mode converter FIG. 2;

FIG. 4B is bottom view of the cover that is mated with the substrate assembly of the mode converter of FIG. 2.

DETAILED DESCRIPTION OF THE INVENTION

Figure 1:
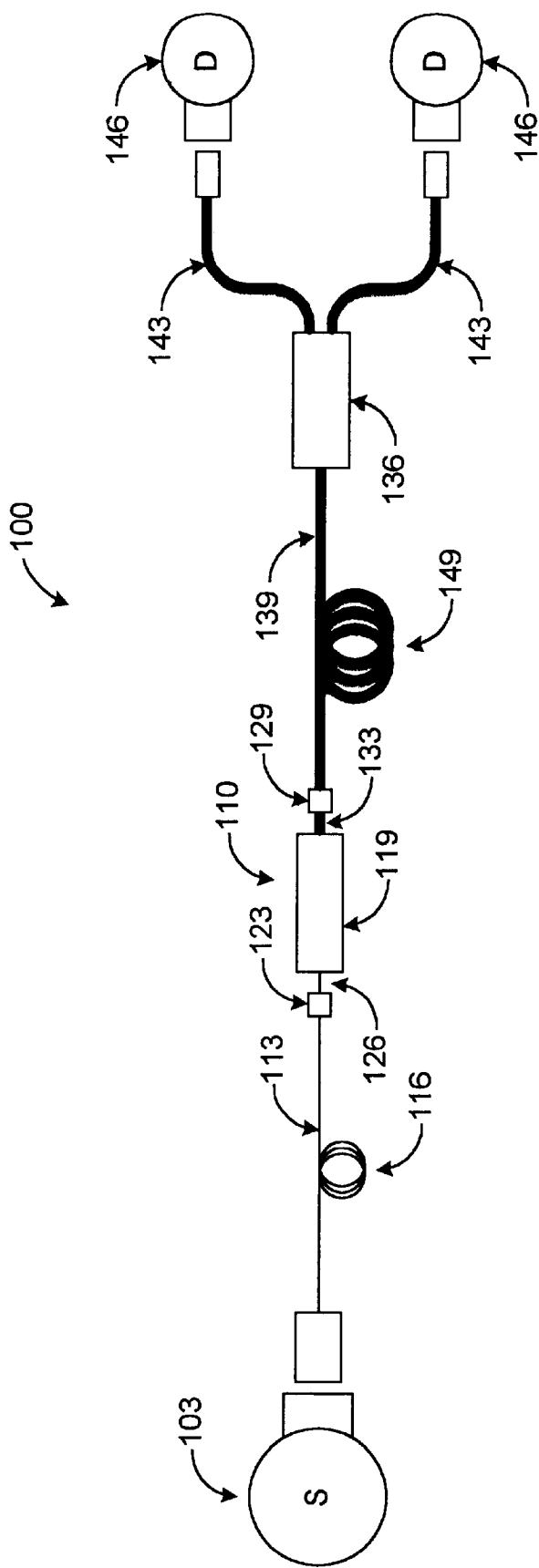
FIG. 1 is a schematic of an optical network according to an embodiment of the present invention.

With reference to FIG. 1, shown is an optical network 100 according to an embodiment of the present invention. The optical network 100 comprises a laser source 103 that is optically coupled to a mode converter 110 via a single-mode optical fiber 113. The laser source 103 may have an operating nominal wavelength of, for example, 1300 nanometers or other operating ranges which are achieved with like devices. Several loops are formed in the single-mode optical fiber 113, thereby forming a mandrel 116 which serves to eliminate unwanted optical propagation in the cladding and to limit unwanted modes in the core of the single-mode optical fiber 113.

The mode converter 110 includes a mode converter body 119 that is optically coupled to a single-mode connector 123 via a single-mode waveguide 126. The mode converter 110 also includes a multimode connector 129 that is optically coupled to the mode converter body 119 via a multimode waveguide 133. The multimode connector 129 is optically coupled to a star coupler 136 via a multimode optical fiber 139. The star coupler 136 serves to split the optical signal transmitted through the multimode optical fiber 139 into two or more multimode optical fibers 143, although only two optical fibers 143 are shown. Both of the multimode optical fibers 143 terminate in optical detectors 146. Note there are several loops included in the multimode optical fiber 139 forming a second mandrel 149.

For purposes of the discussion herein, the star coupler 136, multimode optical fibers 143, and optical detectors 146 are shown as examples of various components that may be employed in a multimode optical fiber network. It is understood that other multimode optical components may be employed as well.

The operation of the optical network 100 is as follows. A laser beam is generated in the laser source 103 and is transmitted through the single-mode optical fiber 113 to the mode converter 110. The mode converter 110 converts the single-mode fiber beam into a multimode fiber beam that is transmitted thorough the multimode optical fiber 139 to the star coupler 136. The star coupler 136 causes the laser beam to be split, where approximately one-half or other appropriate fraction of the power of the laser beam is transmitted through each of the multimode optical fibers 143 to the respective optical detectors 146. Due to the conversion of the single-mode fiber beam into a multimode fiber beam in the mode converter 110, the split in the power of the multimode laser beam among the two multimode optical fibers 143 is approximately even or other appropriate proportion. This is due to the fact that all or most of the modes of the multimode optical fiber 139 are substantially filled.

Figure 2:
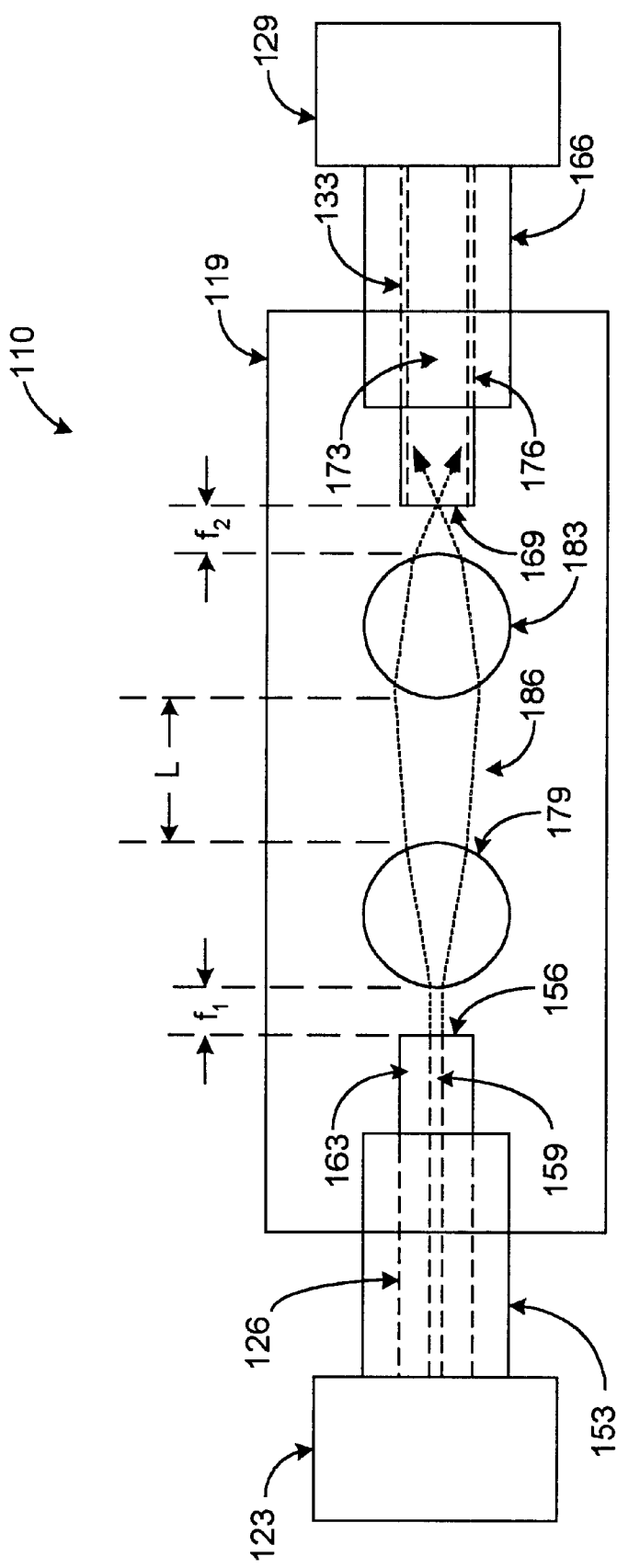
FIG. 2 is a diagrammatic drawing of a mode converter employed in the optical network of FIG. 1.

Turning then, to FIG. 2, shown is the mode converter 110. As seen, the single-mode waveguide 126 is surrounded by a jacket 153 and terminates within the mode converter 110 at an exit face 156. A portion of the jacket 153 has been removed from a section located at the end of the single-mode waveguide 126 which terminates at the exit face 156. The single-mode waveguide 126 is comprised of a single-mode core 159 and a cladding 163. The laser beam which propagates through the single-mode waveguide 126 exits through the exit face 156.

In a similar manner, the multimode waveguide 133 is surrounded by a jacket 166 and terminates within the mode converter 110 at an entrance face 169. A portion of the jacket 166 has been removed from a section located at the end of the multimode waveguide 133 which terminates at the entrance face 169. The multimode waveguide 133 is comprised of a multimode core 173 and a cladding 176. The entrance face 169 is positioned to receive the laser beam, as will be discussed hereinafter.

The mode converter 110 also includes a first ball or spherical lens 179 and a second ball or spherical lens 183. The exit face 156 of the single-mode waveguide 126 is positioned at the focal point of the first ball lens 179 which is a distance $f_1$ from the first ball lens 179. Likewise, the entrance face 169 of the multimode waveguide 133 is positioned at the focal point of the second ball lens 183 which is a distance $f_2$ from the second ball lens 183. The first and second ball lenses 179 and 183 are positioned to form an optical link gap 186 of length L therebetween. The length L is specified so that the exit face 156 and the entrance face 169 both are substantially positioned on the focal point of the first and second ball lenses 179 and 183. Thus, the mode converter 110 forms an optical pathway that extends from the exit face 156 of the single-mode waveguide 126 to the entrance face 169 of the multimode waveguide 133 through the first and second ball lenses 179 and 183. The laser beam travels along this optical pathway from the exit face 156 of the single-mode waveguide 126, through the first and second ball lenses 179 and 183, and into the entrance face 169 of the multimode optical waveguide end 156. It is a significant advantage of the present invention that the first and second ball lenses 179 and 183 condition the laser beam in such a manner that multiple modes are excited in the multimode waveguide 133 as the laser radiation leaves the mode converter 110.

The optical link gap 186 provides an advantage in that it serves to physically separate the single mode side of the mode converter 110 from the multimode side so that vibration introduced to the mode converter 110 by outside forces does not adversely effect the optical coupling between the exit face 156 and the entrance face 169.

With reference to FIG. 3A, shown is a substrate assembly 200 upon which is mounted the mode converter 110 according to an embodiment of the present invention. The substrate assembly 200 includes a substrate 201 which may be made of silica, plastic, or other like material. Mounted on the substrate 201 is the single-mode waveguide 126 which includes a single-mode fiber 126 with a section of the jacket 153 removed at the end. The exposed section of the single-mode waveguide 126 is adhesively fixed into a first single-mode groove 203 and the portion of the single-mode waveguide 126 with the jacket 153 is adhesively fixed into a second single-mode groove 206. The first and second single-mode grooves 203 and 206 are wedge shaped where the second single-mode groove 206 is much deeper than the first single-mode groove 203 to accommodate the greater diameter of the jacket 153. In a similar manner, the multimode waveguide 133 is adhesively fixed into first and second multimode grooves 209 and 213.

The first and second ball lenses 179 and 183 are, for example, sapphire ball lenses, although they may be fashioned from other lens materials. The first and second ball lenses 179 and 183 are adhesively affixed to a first and second support cavities 216 and 219 which are in the form of tetrahedrons, for example, although other shapes may be used as well such as triangular pyramids, etc.

With reference to FIG. 3B, shown is a side view of the substrate assembly 200. From the side view, three transverse grooves 223, 226, and 229 are clearly shown. An index matching medium 233 is disposed between the exit face 156 of the single-mode waveguide 126 and the first ball lens 179. An index matching medium 233 in the form of a gel, for example, is also disposed between the second ball lens 183 and the entrance face 169. The index matching medium 233 prevents unwanted diffraction in the laser beam as it propagates from the exit face 156 to the first ball lens 179 and as it propagates from the second ball lens 183 to the entrance face 169.

With reference to FIGS. 4A and 4B, shown is a side view and a top view of a mode converter cover 300. The mode converter cover 300 is adhesively joined to the substrate assembly 200 (FIGS. 3A and 3B), covering the components which are mounted thereon to protect the components and to ensure the integrity of the optical pathway formed thereby. The mode converter cover 300 includes a first and second cover grooves 303 and 306 which mate opposite the first and second single-mode grooves 203 and 206 (FIGS. 3A and 3B). Likewise, the mode converter cover 300 also includes first and second cover grooves 309 and 313. Note that the cover grooves 303, 306, 309, and 313 are designed to cover the single-mode and multimode waveguides 126 and 133 (FIGS. 3A and 3B) as well as the jackets 153 and 166 (FIGS. 3A and 3B), but do not necessarily come into contact with these components, although such contact may be created if desirable.

The mode converter cover 300 also includes first and second cover support cavities 316 and 319 which mate opposite the first and second support cavities 216 and 219 (FIGS. 3A and 3B). The mode converter cover 300 also features six ribs 323, which mate into the transverse grooves 223, 226, and 229 (FIGS. 3A and 3B), the grooves being placed on either side of the optical pathway. Thus, the six ribs 323 form a first cavity 326, a second cavity 329, and a middle cavity 333 which, with the counterpart space in the transverse grooves 223, 226, and 229, ultimately provide the space through which the optical pathway is established. Note then, that the middle cavity 333 and its transverse groove counterpart form the optical link gap between the first and second ball lenses 179 and 183 (FIGS. 3A and 3B). Also, the first and second cavities 326 and 329 provide the space for the index matching medium 233 disposed therein.

Figure 5:
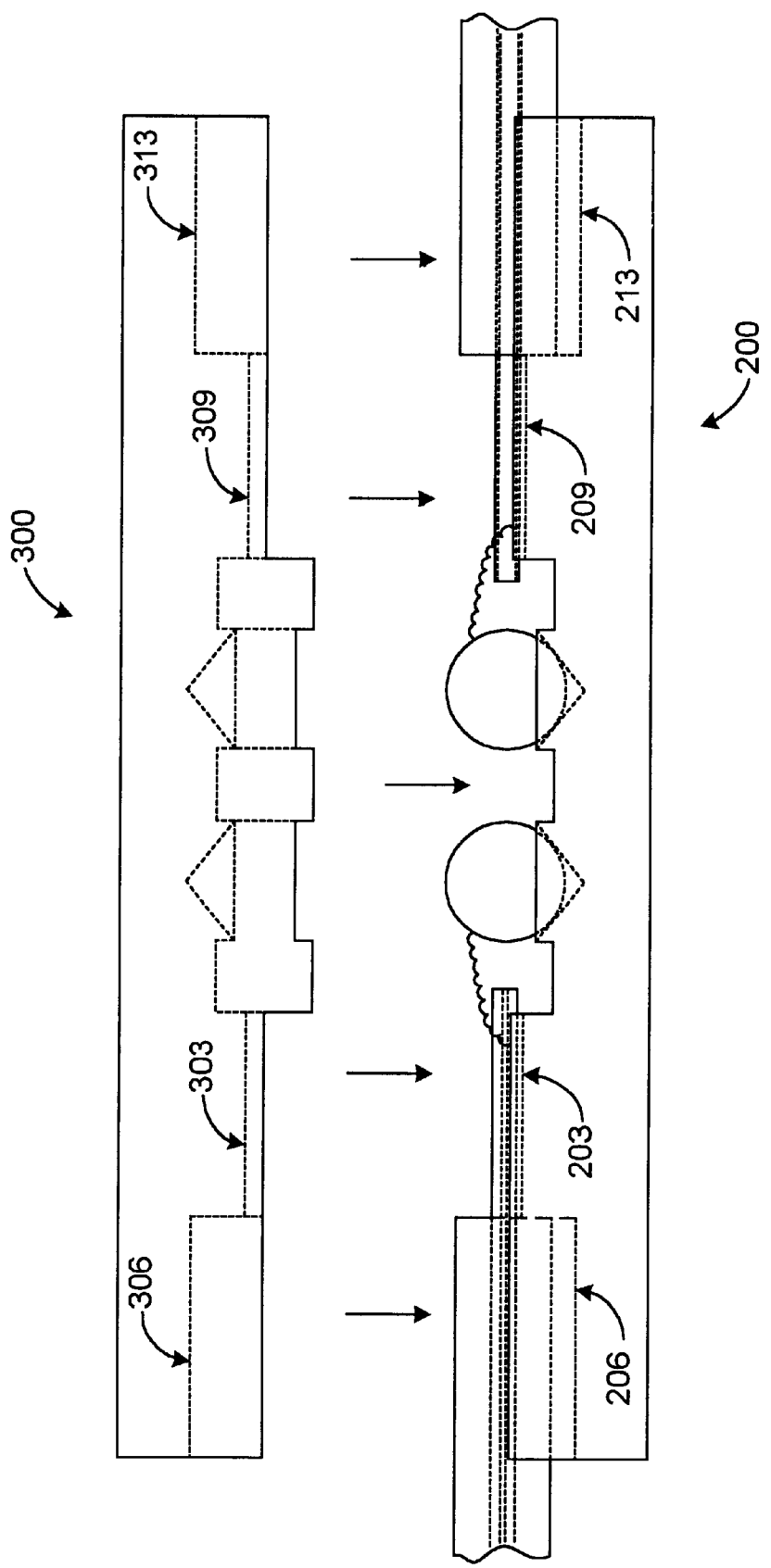
FIG. 5 shows the mating of the cover of FIGS. 4A and 4B with the substrate assembly of FIGS. 3A and 3B.

With reference to FIG. 5, shown is the substrate assembly 200 and the mode converter cover 300 as they assembled together. A suitable adhesive such as, for example, an epoxy is applied to the appropriate planar surfaces of the substrate assembly 200 and the mode converter cover 300. Note that when placed together, the first and second cover grooves 303 and 306 which mate opposite the first and second single-mode grooves 203 and 206 (FIGS. 3A and 3B) thereby forming single-mode ports. Likewise, the first and second cover grooves 309 and 313 mated with the first and second multimode grooves 209 and 213 form multimode ports.

With reference back to FIGS. 3A and 3B, the present invention may also be viewed as a method for manufacturing the mode converter 110. In a first step, the substrate 201 is created using a sheet of substrate material such as silica or like material. The sheet is used to create several substrates 201. Several transverse grooves 223, 226, and 229 are cut into the sheets at appropriate intervals. Thereafter the first and second single-mode grooves 203 and 206, the first and second multimode grooves 209 and 213, and the first and second support cavities 179 and 183 are introduced using bulk machining methods. In another alternative, the substrate 201 is constructed from plastic or like material using an injection molding process in which completed parts with all of the forementioned grooves and support cavities are produced using the mold employed.

Thereafter, the single-mode and multimode waveguides 126 and 133 are placed in the first single-mode groove 203 and the first multimode groove 209, respectively. This is performed on a heated surface. An epoxy or like adhesive is injected into the first single-mode groove 203 and the first multimode groove 209 near the single-mode and multimode waveguides 126 and 133 close to the points where the jackets 153 and 166 have been cut off. The epoxy flows via capillary action along the first single-mode groove 203 and the first multimode groove 209 under the single-mode and multimode waveguides 126 and 133 and ultimately flows out into the transverse grooves 223 and 229. The transverse grooves 223 and 229 provide a place for extraneous adhesive to flow without obstructing the exit face 156 and the entrance face 169. The epoxy adhesive then cures, firmly fixing the single-mode and multimode waveguides 126 and 133 in the first single-mode groove 203 and the first multimode groove 209, respectively.

Next, another adhesive is injected at the base of the jackets 153 and 166 at the ends of the substrate 201. This adhesive flows into the second single-mode groove 206 and the second multimode groove 213 under the jackets 153 and 166, which fixes the jackets 153 and 166 thereto.

Thereafter, a suitable adhesive is placed in the support cavities 216 and 219 and the first and second ball lenses 179 and 183 are placed therein. The adhesive is cured and the index matching medium 233 is applied between the exit face 156 of the single-mode waveguide 126 and the first ball lens 179, and between the entrance face 169 of the multimode waveguide 133 and the second ball lens 183.

With reference once again to FIGS. 4A and 4B, the mode converter cover 300 is fabricated using suitable bulk machining steps, or injection molding. Finally, with reference to FIG. 5, a suitable adhesive is placed on the flat planar surfaces of either the substrate assembly 200 or the mode converter cover 300, and they are mated appropriately and cured at a proper temperature.

Many variations and modifications may be made to the above-described embodiment(s) of the invention without departing substantially from the spirit and principles of the invention. All such modifications and variations are intended to be included herein within the scope of the present invention.

Therefore, having thus described the invention, at least the following is claimed:

1. A single-mode to multimode converter, comprising:
   a substrate;
   a single-mode waveguide attached to the substrate, the single-mode waveguide having an exit face;
   a multimode waveguide attached to the substrate, the multimode waveguide having an entrance face, wherein the single-mode waveguide and multimode waveguide are axially aligned, and wherein an optical pathway extends from the exit face to the entrance face; and
   a first lens and a second lens attached to the substrate and positioned in the optical pathway, the first and second lenses being separated by an optical link gap, such that a focal point of the first lens and the second lens is substantially positioned on the entrance face, wherein the first and second lenses are comprised of a sapphire and are adapted to condition a laser beam propagating along the optical pathway to excite a number of modes in the multimode waveguide.

2. The converter of claim 1, further comprising an index matching medium optically coupling the exit face of the single-mode waveguide to the first lens and the entrance face of the multimode waveguide to the second lens along the optical pathway.

3. The converter of claim 1, further comprising:
   a single-mode port, the single-mode waveguide being fixed therein;
   a multimode port, the multimode waveguide being fixed therein.

4. The converter of claim 1, further comprising:
   a first lens support cavity on the substrate, the first lens being fixed therein;
   a second lens support cavity on the substrate, the second lens being fixed therein.

5. The converter of claim 3, further comprising:
   the single-mode waveguide being adhesively fixed to the substrate in the single-mode port; and
   the multimode waveguide being adhesively fixed to the substrate in the multimode port.

6. A hybrid multimode/single-mode optical network, comprising:
   a mode converter comprising
      a substrate;
      a single-mode waveguide attached to the substrate, the single-mode waveguide having an exit face;
      a multimode waveguide attached to the substrate, the multimode waveguide having an entrance face, wherein the single-mode waveguide and multimode waveguide are axially aligned, and wherein an optical pathway extends from the exit face to the entrance face;

a first lens and a second lens attached to the substrate and positioned in the optical pathway, the first and second lenses being separated by an optical link gap, such that a focal point of the first lens and the second lens is substantially positioned on the entrance face, and the first and second lenses being adapted to condition a laser beam propagating along the optical pathway to excite a number of modes in the multimode waveguide;

a laser source optically coupled to the single-mode waveguide; and a multimode destination point optically coupled to the multimode waveguide.

7. A method for converting modes in an optical network, comprising the steps of:

transmitting a laser beam along an optical pathway extending from an exit face of a single-mode waveguide to an entrance face of a multimode waveguide, the single-mode waveguide and multimode waveguide being axially aligned; and conditioning the laser beam using a first ball lens and a second ball lens located in the optical pathway having an optical link gap therebetween to excite a number of modes in the multimode waveguide, the optical link gap being dimensioned such that a focal point of the first ball lens and the second ball lens is substantially positioned on the entrance face.

8. The method of claim 7, further comprising the steps of:

optically coupling the exit face of the single-mode waveguide to the first ball lens with an index matching medium; and optically coupling the entrance face of the multimode waveguide to the second ball lens with the index matching medium.

9. The method of claim 7, further comprising the steps of:

fixing the single-mode waveguide in a single-mode port; and fixing the multimode waveguide in a multimode port.

10. The method of claim 7, further comprising the steps of:

supporting the first ball lens in a first ball lens support cavity; and supporting the second ball lens in a second ball lens support cavity.

11. A method for mode conversion in a hybrid multimode/single-mode optical network, comprising the steps of:

generating a laser beam with a laser;

transmitting the laser beam along an optical pathway extending from an exit face of a single-mode wavelength to an entrance face of a multimode waveguide, the single-mode waveguide and multimode waveguide being axially aligned; and conditioning the laser beam using a first sapphire ball lens and a second sapphire ball lens located in the optical pathway having an optical link gap therebetween, thereby exciting a number of modes in the multimode waveguide, the optical link gap being dimensioned such that a focal point of the first ball lens and the second ball lens is substantially positioned on the entrance face; and receiving the laser beam in an optical destination device optically coupled to the multimode waveguide.

12. A single-mode to multimode converter, comprising:

a substrate;

a single-mode waveguide attached to the substrate, the single-mode waveguide having an exit face;

a multimode waveguide attached to the substrate, the multimode waveguide having an entrance face, and wherein an optical pathway extends from the exit face to the entrance face; and a first ball lens and a second ball lens attached to the substrate and positioned in the optical pathway, the first and second ball lenses being separated by an optical link gap, such that a focal point of the first ball lens and the second ball lens is substantially positioned on the entrance face, wherein the first and second ball lenses are comprised of sapphire and are adapted to condition a laser beam propagating along the optical pathway to excite a number of modes in the multimode waveguide.

\* \* \* \* \*